US012687244B2

(12) United States Patent
Idomoto et al.

(10) Patent No.: US 12,687,244 B2
(45) Date of Patent: Jul. 21, 2026

(54) PIPE-JOINING ATTACHMENT FOR WORK MACHINE, WORK MACHINE PROVIDED WITH SAME, AND PIPE-JOINING METHOD

(71) Applicant: KUBOTA CORPORATION, Osaka (JP)

(72) Inventors: Yasushi Idomoto, Hyogo (JP); Hayato Kageyama, Hyogo (JP); Yasuhiro Miyazaki, Osaka (JP); Yusuke Takagi, Osaka (JP); Keiichiro Yamamoto, Osaka (JP); Masato Takenonaka, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 131 days.

(21) Appl. No.: 18/703,072

(22) PCT Filed: Oct. 20, 2022

(86) PCT No.: PCT/JP2022/039046
§ 371 (c)(1),
(2) Date: Apr. 19, 2024

(87) PCT Pub. No.: WO2023/068319
PCT Pub. Date: Apr. 27, 2023

(65) Prior Publication Data
US 2024/0418296 A1    Dec. 19, 2024

(30) Foreign Application Priority Data
Oct. 21, 2021    (JP) ................................. 2021-172218

(51) Int. Cl.
*F16L 1/09*        (2006.01)
*F16L 1/036*       (2006.01)
*F16L 1/06*        (2006.01)

(52) U.S. Cl.
CPC ............... *F16L 1/065* (2013.01); *F16L 1/036* (2013.01); *F16L 1/09* (2013.01)

(58) Field of Classification Search
CPC ... F16L 1/09; F16L 1/065; F16L 1/036; F16L 1/10
See application file for complete search history.

(56) References Cited

U.S. PATENT DOCUMENTS 3,561,615 A * 2/1971 Forsberg ................... F16L 1/09
                                                        294/81.61
3,653,115 A * 4/1972 Perkins ..................... F16L 1/09
                                                        29/237

(Continued)

FOREIGN PATENT DOCUMENTS

AU        2019419018 A1 *  2/2021  ............... B66C 1/68
JP        5-65978 A        3/1993

(Continued)

OTHER PUBLICATIONS

Office Action dated Feb. 12, 2025 in Japanese family member Patent Application No. 2021-172218 with English language translation thereof.

(Continued)

*Primary Examiner* — Frederick L Lagman
(74) *Attorney, Agent, or Firm* — GREENBLUM & BERNSTEIN, P.L.C.

(57)            ABSTRACT
A pipe-joining attachment of a work machine includes an arm connecting unit connected to an arm of the work machine; a grip unit configured to grip a pipe; and a to-be-joined pipe contact unit located with respect to the grip unit in an axial direction of an insertion port of the pipe which is gripped by the grip unit and configured to come into contact with an outer peripheral surface of a to-be-joined pipe to be joined to the pipe on a receiving port side.

8 Claims, 6 Drawing Sheets

(56) References Cited

U.S. PATENT DOCUMENTS

| | | | | |
|---|---|---|---|---|
| 3,831,256 A * | 8/1974 | Bjalme | ............... | B29C 65/7802 |
| | | | | 29/237 |
| 6,280,119 B1 * | 8/2001 | Ryan | ....................... | B66C 1/427 |
| | | | | 405/175 |
| 8,490,519 B2 * | 7/2013 | Lavalley | ............... | E21B 19/168 |
| | | | | 81/57.35 |
| 11,480,019 B2 * | 10/2022 | Lavalley | ............... | E21B 19/161 |
| 2005/0117973 A1 * | 6/2005 | Nelson | .................... | F16L 1/065 |
| | | | | 405/184.5 |
| 2010/0086361 A1 * | 4/2010 | Harrison | ................... | B66C 1/42 |
| | | | | 405/184 |
| 2013/0121769 A1 * | 5/2013 | Gately | ................... | F16L 1/028 |
| | | | | 405/174 |
| 2016/0160588 A1 | 6/2016 | LaValley et al. | | |

FOREIGN PATENT DOCUMENTS

| | | | |
|---|---|---|---|
| JP | 5-231565 A | 9/1993 | |
| JP | 5-231566 A | 9/1993 | |
| JP | 6-323468 A | 11/1994 | |
| JP | 8-28751 A | 2/1996 | |
| JP | 2015-75928 A | 4/2015 | |
| JP | 2020-63819 A | 4/2020 | |
| WO | 2013/166559 A1 | 11/2013 | |

OTHER PUBLICATIONS

International Search Report dated Dec. 20, 2022 issued in International Bureau of WIPO Patent Application No. PCT/JP2022/039046, with an English translation thereof.

International Preliminary Report on Patentability dated Apr. 23, 2024 (in English) with Written Opinion dated Dec. 20, 2022 issued in International Bureau of WIPO Patent Application No. PCT/JP2022/039046, with an English translation thereof.

Extended European Search Report, dated Sep. 29, 2025 in European family member application No. 22883623.5.

Office Action, dated Sep. 30, 2025, in Taiwanese family member application No. 111139906. Note most of the document is not in the English language; however, the document is provided for its characterization, in English language characters (e.g., "X", "Y", etc.), of previously-submitted documents. The Examiner's consideration of this document on that basis is respectfully requested.

* cited by examiner

OTHER SIDE

WIDTH
DIRECTION

ONE SIDE

AXIAL
DIRECTION
OTHER SIDE ◄──────► ONE SIDE

UP

UP-DOWN
DIRECTION

DOWN

ONE SIDE ◄──────► OTHER SIDE
WIDTH
DIRECTION

AXIAL
DIRECTION
OTHER SIDE ◄━━━━► ONE SIDE

UP

UP-DOWN
DIRECTION

DOWN

AXIAL
DIRECTION
OTHER SIDE ◄━━━━► ONE SIDE

UP

UP-DOWN
DIRECTION

DOWN

PIPE-JOINING ATTACHMENT FOR WORK MACHINE, WORK MACHINE PROVIDED WITH SAME, AND PIPE-JOINING METHOD

TECHNICAL FIELD

The present invention relates to a pipe-joining attachment that is connected to an arm of a work machine and used to join a pipe to a to-be-joined pipe, a work machine provided with the same, and a pipe-joining method.

BACKGROUND ART

For example, in laying work of a ductile cast iron pipe (an example of a water pipe) having an insertion port and a receiving port used for the water pipe or the like, pipe joining work is performed for joining a pipe to a to-be-joined pipe disposed in a groove in the ground. In this pipe joining work, an operator first needs to hang down the pipe, which is joined to the to-be-joined pipe, into the groove. After this, the operator needs to align the pipe and the to-be-joined pipe in the groove, insert the insertion port of the pipe into the receiving port of the to-be-joined pipe, and join the insertion port and the receiving port.

In such conventional pipe joining work, the operator needs to hang down the pipe into the groove while confirming a position of the pipe with respect to the to-be-joined pipe in the groove. In addition, the operator needs to manually align the pipe and the to-be-joined pipe in the groove.

As described above, in conventional pipe joining work, a workload on the operator is high, and it is necessary to perform work in the narrow groove. Therefore, the workability is not so good.

On the other hand, for example, in Patent Literature 1, a pipe laying machine is disclosed, in which a pipe holding main body, which is rotatable in a horizontal direction at a tip of an arm, includes a light receiver that receives a laser beam from a laser transmitter for pipe positioning, a pair of clamp materials that has claws at both end parts, and a roller for automatic centering of a laying pipe. The laser transmitter is installed in the groove such that the laser beam is able to pass through a center of the laying pipe. The light receiver is disposed at a position protruding from the pipe holding main body so as to receive the laser beam of the laser transmitter at the center of the laying pipe.

In a state where the laying pipe is gripped by the pair of clamp materials, the pipe laying machine is able to lower the laying pipe into the groove by moving the pipe holding main body in the horizontal direction while moving the arm. The pipe laying machine moves the arm or the like to adjust a position of the laying pipe so that the laser of the laser transmitter hits the light receiver when the laying pipe is lowered into the groove.

Accordingly, in the pipe laying machine, the laying pipe is able to be safely and automatically laid in the groove without a person entering the groove.

CITATION LIST

Patent Literature

Patent Literature 1: Japanese Patent Application Laid-Open No. 6-323468

SUMMARY OF INVENTION

Technical Problem

The pipe laying machine disclosed in Patent Literature 1 positions a pipe using a laser beam in a groove in the ground. Therefore, the pipe is able to be disposed straight along the laser beam in the groove.

For example, in a case where an aseismic pipe or the like is disposed in the groove, the aseismic pipe may be disposed with respect to the to-be-joined pipe with an allowable bending angle. As described above, when the pipe is joined to the to-be-joined pipe in the groove in the ground, in addition to a case where the pipe is joined straight along a pipe axis of the to-be-joined pipe, there is also a case where the pipe is joined to the to-be-joined pipe by being bent at a predetermined angle with respect to the to-be-joined pipe.

In this manner, in a case where the pipe is joined to the to-be-joined pipe by being bent at a predetermined angle with respect to the to-be-joined pipe in the groove in the ground, even when the pipe laying machine disclosed in Patent Literature 1 is used, it is difficult to accurately position the insertion port of the pipe with respect to the receiving port of the to-be-joined pipe in the groove.

An object of the present invention is to obtain a configuration of a pipe-joining attachment which is able to easily position an insertion port of a pipe with respect to a receiving port of a to-be-joined pipe, even in a case where the pipe is joined to the to-be-joined pipe by being bent at a predetermined angle with respect to the to-be-joined pipe in a groove in the ground, in connection with an attachment of a work machine which is connected to an arm of the work machine.

Solution to Problem

A pipe-joining attachment of a work machine according to an embodiment of the present invention includes an arm connecting unit connected to an arm of the work machine; a grip unit configured to grip a pipe; and a to-be-joined pipe contact unit located with respect to the grip unit in an axial direction of an insertion port of the pipe which is gripped by the grip unit and configured to come into contact with an outer peripheral surface of a to-be-joined pipe to be joined to the pipe on a receiving port side (first configuration).

The to-be-joined pipe contact unit of the pipe-joining attachment that grips the pipe with the grip unit comes into contact with the outer peripheral surface of the to-be-joined pipe on the receiving port side, and thereby the insertion port of the pipe is able to be easily positioned with respect to the receiving port of the to-be-joined pipe. Moreover, even when joining the pipe to the to-be-joined pipe by bending the pipe at a predetermined angle with respect to the to-be-joined pipe, by positioning the insertion port of the pipe with respect to the receiving port of the to-be-joined pipe as described above, the insertion port of the pipe is able to be easily positioned with respect to the receiving port of the to-be-joined pipe.

Therefore, with the above-described configuration, even when joining the pipe to the to-be-joined pipe by bending the pipe at a predetermined angle with respect to the to-be-joined pipe in the groove in the ground, it is possible to realize the pipe-joining attachment of the work machine in which the insertion port of the pipe is able to be easily positioned with respect to the receiving port of the to-be-joined pipe.

In the first configuration, the to-be-joined pipe contact unit comes into contact with a portion of the outer peripheral surface of the to-be-joined pipe on the receiving port side, is the portion being located in at least one of a first direction and a second direction orthogonal to the first direction when the receiving port is viewed in an axial direction of the to-be-joined pipe (second configuration).

As described above, the to-be-joined pipe contact unit of the pipe-joining attachment comes into contact with the receiving port of the to-be-joined pipe, and thereby the insertion port of the pipe gripped by the grip unit of the pipe-joining attachment is able to be positioned with respect to the receiving port of the to-be-joined pipe in at least one of the first direction and the second direction when the receiving port is viewed in the axial direction of the to-be-joined pipe. Accordingly, even when joining the pipe to the to-be-joined pipe by bending the pipe at a predetermined angle with respect to the to-be-joined pipe, the pipe-joining attachment is obtained in which the insertion port of the pipe is able to be more accurately positioned with respect to the receiving port of the to-be-joined pipe.

In the first or second configuration, the pipe-joining attachment further includes a horizontal-direction rotation mechanism configured to rotate the grip unit in a horizontal direction around a rotation axis extending in an up-down direction (third configuration).

Accordingly, the pipe gripped by the grip unit of the pipe-joining attachment is able to be rotated in the horizontal direction around the rotation axis extending in the up-down direction. Therefore, according to the pipe-joining attachment having the above-described configuration, the insertion port of the pipe is able to be easily positioned with respect to the receiving port of the to-be-joined pipe disposed in the groove in the ground without moving or turning the work machine.

In a configuration according to any one of the first to third configurations, the pipe-joining attachment further includes a horizontal-direction movement mechanism configured to move the grip unit in a direction that is orthogonal to an axis of the pipe gripped by the grip unit and is the horizontal direction (fourth configuration).

Accordingly, the pipe gripped by the grip unit is able to be moved in the direction that is orthogonal to the axis of the pipe and is the horizontal direction. Therefore, with the pipe-joining attachment having the above-described configuration, the position of the pipe is able to be finely adjusted in the direction that is orthogonal to the axis of the pipe and is the horizontal direction. Accordingly, with the pipe-joining attachment, the insertion port of the pipe is able to be easily and accurately positioned with respect to the receiving port of the to-be-joined pipe without moving the work machine.

In a configuration according to any one of the first to fourth configurations, the pipe-joining attachment further includes an axial-direction movement mechanism configured to move the grip unit toward the to-be-joined pipe contact unit in the axial direction (fifth configuration).

Accordingly, the insertion port of the pipe gripped by the grip unit of the pipe-joining attachment is able to be moved toward the receiving port of the to-be-joined pipe with which the to-be-joined pipe contact unit comes into contact. Therefore, the insertion port of the pipe gripped by the grip unit is able to be inserted into the receiving port in a state of being positioned with respect to the receiving port of the to-be-joined pipe. Accordingly, even when joining the pipe to the to-be-joined pipe by bending the pipe at a predetermined angle with respect to the to-be-joined pipe, the joining work between the pipe and the to-be-joined pipe is able to be easily performed.

A work machine according to an embodiment of the present invention includes the pipe-joining attachment of a work machine having the configuration according to any one of the first to fifth configurations; and the arm where the pipe-joining attachment is attached to a tip portion (sixth configuration).

Accordingly, it is possible to realize the work machine including the pipe-joining attachment having the configuration according to any one of the first to fifth configurations. Therefore, the insertion port of the pipe is able to be easily positioned with respect to the receiving port of the to-be-joined pipe by using the work machine.

In the sixth configuration, the work machine further includes an image acquisition portion configured to acquire an image on which a position of the to-be-joined pipe contact unit of the pipe-joining attachment with respect to a receiving port of the to-be-joined pipe is able to be grasped (seventh configuration).

Accordingly, the position of the to-be-joined pipe contact unit of the pipe-joining attachment with respect to the receiving port of the to-be-joined pipe is able to be easily grasped with the image acquired by the image acquisition portion. Therefore, the to-be-joined pipe contact unit of the pipe-joining attachment is able to easily come into contact with the receiving port of the to-be-joined pipe. Therefore, the work machine is used to easily position the insertion port of the pipe with respect to the receiving port of the to-be-joined pipe.

A pipe-joining method using a pipe-joining attachment of a work machine according to an embodiment of the present invention is a pipe-joining method of joining an insertion port of a pipe to a receiving port of a to-be-joined pipe by using the pipe-joining attachment of a work machine according to any one of the first to fifth configurations. The pipe-joining method includes a gripping step of gripping the pipe by a grip unit; and a positioning step of positioning the insertion port of the pipe with respect to the receiving port of the to-be-joined pipe by bringing a to-be-joined pipe contact unit into contact with the receiving port of the to-be-joined pipe in a state of gripping the pipe by the grip unit (first method).

Therefore, the insertion port of the pipe is able to be easily positioned with respect to the receiving port of the to-be-joined pipe by using the pipe-joining attachment of the work machine.

Advantageous Effects of Invention

A pipe-joining attachment of a work machine according to an embodiment of the present invention includes an arm connecting unit connected to an arm of the work machine; a grip unit configured to grip a pipe; and a to-be-joined pipe contact unit located with respect to the grip unit in an axial direction of an insertion port of the pipe which is gripped by the grip unit and configured to come into contact with an outer peripheral surface of a receiving port of a to-be-joined pipe to be joined to the pipe.

Accordingly, the insertion port of the pipe gripped by the pipe-joining attachment attached to the arm of the work machine is able to be easily positioned with respect to the receiving port of the to-be-joined pipe. Therefore, with the above-described configuration, even when joining the pipe to the to-be-joined pipe by bending the pipe at a predetermined angle with respect to the to-be-joined pipe in the groove in the ground, it is possible to realize the pipe-joining attachment in which the insertion port of the pipe is able to be easily positioned with respect to the receiving port of the to-be-joined pipe.

DESCRIPTION OF EMBODIMENTS

Figure 1:
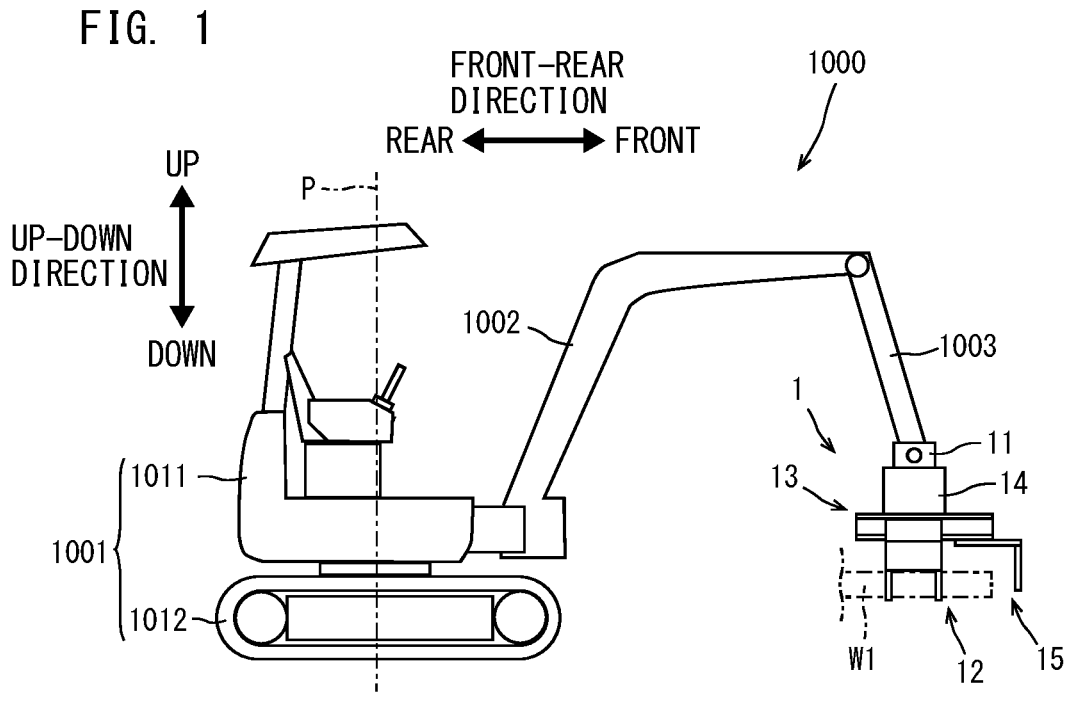
FIG. 1 is a view illustrating a schematic configuration of a work machine to which a pipe-joining attachment according to Embodiment 1 is connected.

Hereinafter, each embodiment will be described with reference to drawings. In each drawing, the same portions are denoted by the same reference numerals, and the description of the same portions will not be repeated. Dimensions of constituent members in each drawing do not faithfully represent dimensions of actual constituent members, dimensional ratios of each constituent member, and the like.

In the following description, front-rear and left-right directions mean front-rear and left-right directions as viewed from an operator who operates work machines 1000 and 2000, respectively. In addition, an axial direction means a direction in which an axis L of a pipe W1 gripped by pipe-joining attachments 1, 100, and 200 extends. A width direction means a direction that is a horizontal direction and orthogonal to the axial direction. The horizontal direction includes not only a strict horizontal direction but also directions intersecting an up-down direction.

Further, in the following description, an expression "fixed", "connected", "attached", or the like (hereinafter, fixed or the like) includes not only a case where members are directly fixed or the like together, but also a case where the members are fixed or the like together via other members. That is, in the following description, the expression such as fixed or the like includes meaning of direct and indirect fixation or the like of the members.

Embodiment 1

(Work Machine)

FIG. 1 is a view illustrating a schematic configuration of a work machine 1000 to which a pipe-joining attachment 1 according to Embodiment 1 of the present invention is connected. The pipe-joining attachment 1 is connected to a tip portion of an arm 1003 of the work machine 1000. The work machine 1000 is able to perform various constructions, work, and the like by replacing the attachment which is connected to the tip portion of the arm 1003. In the present embodiment, the work machine 1000 is, for example, a mini-backhoe which is a construction machine for excavating.

The work machine 1000 may be a construction machine other than the mini-backhoe, and may be a machine having any configuration as long as the machine is able to operate the pipe-joining attachment 1.

The work machine 1000 is able to travel in the front-rear direction and is able to turn in the horizontal direction around a rotation axis P extending in the up-down direction. The work machine 1000 is able to be driven, for example, hydraulically. The work machine may be driven by, for example, an electric motor.

The work machine 1000 includes a work machine main body 1001, a boom 1002, and the arm 1003.

The work machine main body 1001 has an upper turning body 1011 and a lower traveling body 1012. The upper turning body 1011 is able to turn in the horizontal direction around the rotation axis P. The lower traveling body 1012 has an annular infinite track and is able to travel in the front-rear direction.

The boom 1002 is a beam-shaped member extending forward from the upper turning body 1011. One end side of the boom 1002 is connected to the upper turning body 1011. The boom 1002 is able to rotate in the up-down direction with respect to the upper turning body 1011 around the one end side.

The arm 1003 is a beam-shaped member of which one end side is connected to a front end portion of the boom 1002. The arm 1003 is able to rotate in the up-down direction with respect to the boom 1002 around the one end side. The attachment is able to connect to the other end side of the arm 1003. In the present embodiment, the pipe-joining attachment 1 is connected to the other end side of the arm 1003.

The boom 1002 and the arm 1003 are able to be driven by a hydraulic cylinder (not illustrated), respectively. The boom 1002 and the arm 1003 may be driven by an electric motor or the like.

The pipe-joining attachment 1 may be connected to the other end side of the arm 1003 via an attachment mounting member. The attachment mounting member is configured to easily attach the attachment to the other end side of the arm 1003.

Since each configuration of the work machine main body 1001, the boom 1002, and the arm 1003 in the work machine 1000 is the same as the configuration in the related art, detailed description thereof will be omitted.

(Pipe-Joining Attachment)

Figure 2:
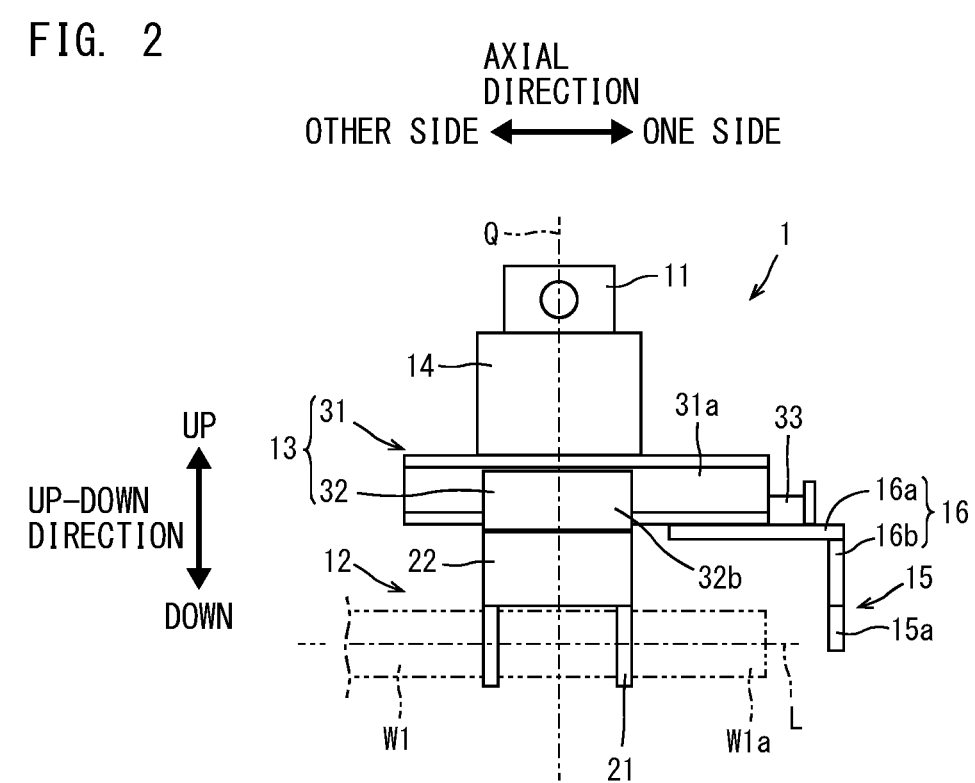
FIG. 2 is a view of the pipe-joining attachment as viewed from one side in a width direction.
Figure 3:
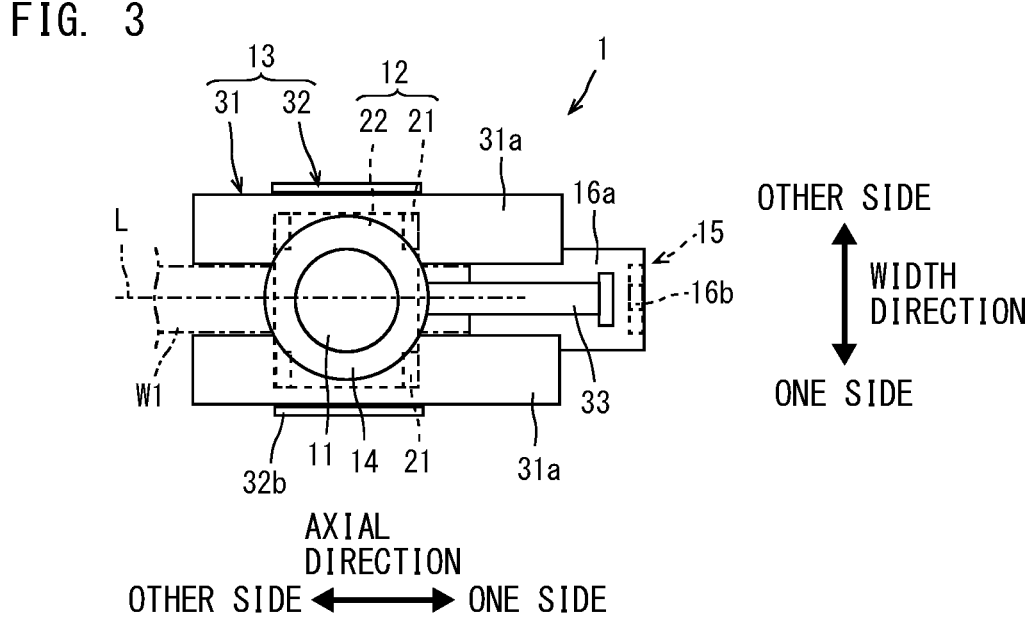
FIG. 3 is a top view of the pipe-joining attachment.
Figure 4:
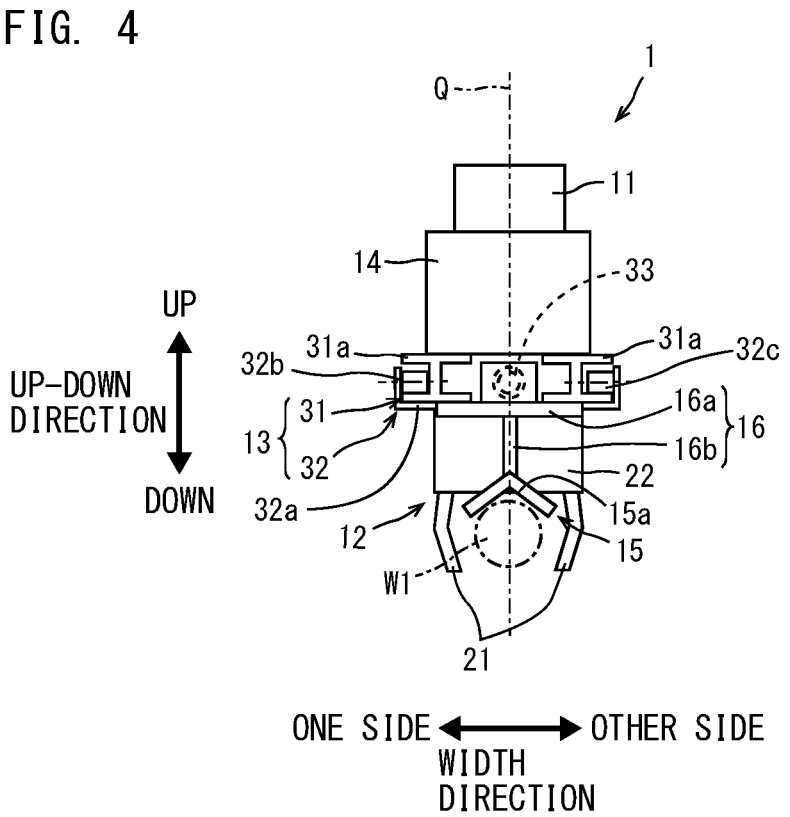
FIG. 4 is a view of the pipe-joining attachment as viewed from one side in an axial direction.
Figure 5:
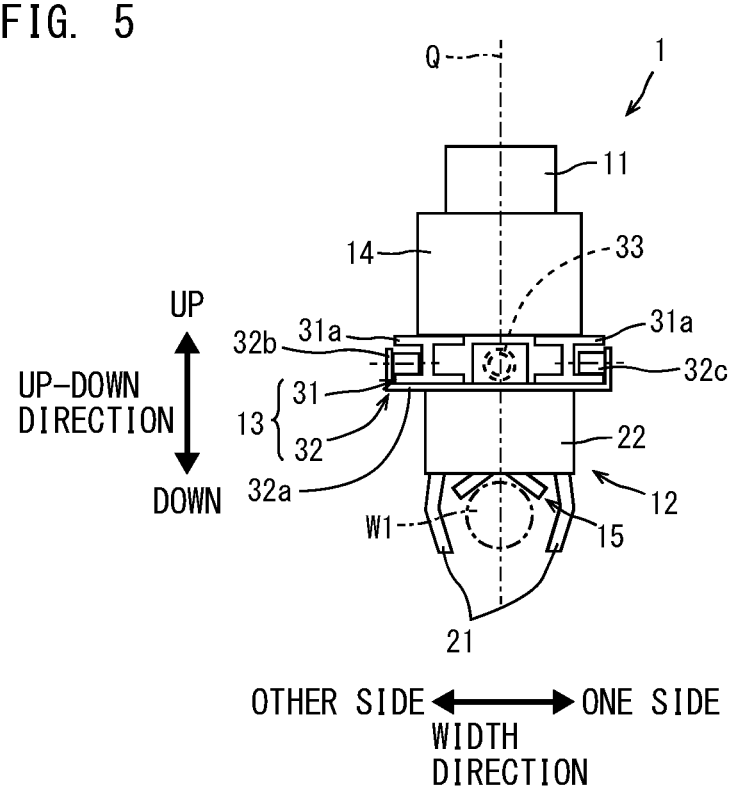
FIG. 5 is a view of the pipe-joining attachment as viewed from the other side in the axial direction.

FIGS. 2 to 5 are views illustrating a schematic configuration of the pipe-joining attachment 1. FIG. 2 is a view of the pipe-joining attachment 1 as viewed from one side in the width direction. FIG. 3 is a top view of the pipe-joining attachment 1. FIG. 4 is a view of the pipe-joining attachment 1 as viewed from one side in the axial direction. FIG. 5 is a view of the pipe-joining attachment 1 as viewed from the other side in the axial direction. Hereinafter, a schematic configuration of the pipe-joining attachment 1 will be described with reference to FIGS. 2 to 5.

In the following description, the pipe W1 and the to-be-joined pipe W2 (see FIGS. 6 to 8) are preferably aseismic pipes, for example, having aseismic-type joints that are able to bend at a predetermined angle. The pipe W1 and the to-be-joined pipe W2 may be pipes other than the aseismic pipes.

The pipe-joining attachment 1 is configured to be able to grip the pipe W1 and is able to rotate the gripped pipe W1 in the horizontal direction around a rotation axis Q extending in the up-down direction, and is able to move in the axial direction of the pipe W1. As illustrated in FIGS. 2 to 5, the pipe-joining attachment 1 includes an arm connecting unit 11, a grip unit 12, an axial-direction movement mechanism 13, a horizontal-direction rotation mechanism 14, and a to-be-joined pipe contact unit 15.

The arm connecting unit 11 is located at an upper end portion of the pipe-joining attachment 1 and is connected to the other end side of the arm 1003 of the work machine 1000. The arm connecting unit 11 may be connected to the other end side of the arm 1003 by a bolt or a pin, or may be fitted into the other end side of the arm 1003 by a fitting portion. The arm connecting unit 11 may be connected to the other end side of the arm 1003 in any configuration.

The grip unit 12 is supported to be movable in the axial direction by the axial-direction movement mechanism 13 which will be described later. The grip unit 12 grips the pipe W1. The grip unit 12 has a pair of grip claws 21 and a grip driving portion 22.

The pair of grip claws 21 are located side by side in the width direction orthogonal to the axial direction so that the pipe W1 is able to be gripped. One end side of the pair of grip claws 21 is connected to the grip driving portion 22. The pair of grip claws 21 are able to rotate with respect to the grip driving portion 22 in directions closer to and away from each other around the one end side. The pair of grip claws 21 sandwich the pipe W1 in the width direction.

In the present embodiment, the grip unit 12 has two sets of the pair of grip claws 21. The two sets of the pair of the grip claws 21 are disposed side by side in the axial direction of the pipe W1 with respect to the grip driving portion 22.

The grip driving portion 22 gives a driving force to one end side of the pair of grip claws 21 such that the pair of grip claws 21 rotate in directions closer to and away from each other around the one end side. The grip driving portion 22 may generate the driving force using, for example, a hydraulic pressure output from the work machine 1000, or may generate the driving force with an electric motor or the like.

The axial-direction movement mechanism 13 is supported to be rotatable in the horizontal direction around the rotation axis Q by the horizontal-direction rotation mechanism 14 which will be described later. The axial-direction movement mechanism 13 moves the grip unit 12 in the axial direction of the pipe W1 which is gripped by the grip unit 12. The axial-direction movement mechanism 13 includes a guide portion 31, a slider 32, and an axial-direction driving portion 33.

The guide portion 31 is connected to the horizontal-direction rotation mechanism 14 which is described later so as to be rotatable in the horizontal direction around the rotation axis Q. The guide portion 31 has, for example, a pair of guide rails 31a extending along the axis L of the pipe W1. That is, the pair of guide rails 31a extend in the axial direction. Therefore, in the present embodiment, a longitudinal direction of the pair of guide rails 31a coincides with the axial direction. The guide rail 31a is an H-shaped steel having, on upper and lower sides thereof, flanges that protrude in the width direction when viewed in the axial direction. The guide rail 31a may be a member other than the H-shaped steel.

The slider 32 is provided to be movable with respect to the guide portion 31 in the longitudinal direction of the guide portion 31, that is, in the axial direction. The slider 32 is formed in a substantially U-shaped cross section so as to cover lower surfaces and side surfaces of the pair of guide rails 31a of the guide portion 31. That is, the slider 32 has a bottom surface 32a and a pair of side surfaces 32b that extend upward from the bottom surface 32a. Rollers 32c are rotatably supported on the pair of side surfaces 32b of the slider 32. The rollers 32c roll and move on the flanges of the pair of guide rails 31a.

The axial-direction driving portion 33 is able to move the slider 32 with respect to the guide portion 31 in the longitudinal direction of the guide portion 31, that is, in the axial direction. For example, the axial-direction driving portion 33 is a hydraulic cylinder. For example, the hydraulic pressure output from the work machine 1000 is supplied to the hydraulic cylinder. Although not particularly illustrated, a cylinder tube of the hydraulic cylinder is fixed to the guide portion 31 via a support portion 16 that supports the to-be-joined pipe contact unit 15 which will be described later. A piston rod of the hydraulic cylinder is fixed to the slider 32. The hydraulic cylinder is disposed to extend in the longitudinal direction of the guide portion 31, that is, in the axial direction. Therefore, when the piston rod of the hydraulic cylinder moves in the axial direction with respect to the cylinder tube, the slider 32 is able to be moved in the axial direction with respect to the guide portion 31.

Accordingly, the pipe W1 gripped by the grip unit 12 of the pipe-joining attachment 1 is able to be moved in the axial direction. Therefore, with the pipe-joining attachment 1, the insertion port W1a of the pipe W1 is able to be easily positioned with respect to the receiving port W2a of the to-be-joined pipe W2 (see FIGS. 6 to 8), and an insertion port W1a of the pipe W1 is able to be easily inserted into a receiving port W2a of the to-be-joined pipe W2.

The horizontal-direction rotation mechanism 14 is connected to the arm 1003 of the work machine 1000 via the arm connecting unit 11. That is, the arm connecting unit 11 is fixed to the upper portion of the horizontal-direction rotation mechanism 14. The guide portion 31 is connected to the lower portion of the horizontal-direction rotation mechanism 14 to be rotatable in the horizontal direction around the rotation axis Q.

Accordingly, the horizontal-direction rotation mechanism 14 is able to rotate the pipe-joining attachment 1 with respect to the arm 1003 of the work machine 1000 in the horizontal direction around the rotation axis Q. Therefore, the pipe W1 gripped by the grip unit 12 of the pipe-joining attachment 1 is able to be moved into the groove or the like in the ground without moving and turning the work machine 1000.

The to-be-joined pipe contact unit 15 is fixed to the guide portion 31 of the axial-direction movement mechanism 13 by the support portion 16 so as to be located with respect to the grip unit 12 in the axial direction of the insertion port W1a of the pipe W1. As will be described later, the to-be-joined pipe contact unit 15 comes into contact with the to-be-joined pipe W2 on the receiving port W2a side when the insertion port W1a of the pipe W1 gripped by the grip unit 12 is positioned with respect to the receiving port W2a of the to-be-joined pipe W2. The receiving port W2a side of the to-be-joined pipe W2 includes not only the receiving port W2a of the to-be-joined pipe W2 but also the receiving port W2a side of the pipe main body in the to-be-joined pipe W2.

The support portion 16 is fixed to the guide portion 31 of the axial-direction movement mechanism 13. The support portion 16 has a support main body 16a and a connection support portion 16b. The support main body 16a has a flat plate shape and is fixed to the guide portion 31 of the axial-direction movement mechanism 13. The connection support portion 16b extends downward from the support main body 16a. The connection support portion 16b supports the to-be-joined pipe contact unit 15.

The to-be-joined pipe contact unit 15 is formed in an inverted V shape in which a distance between linear portions 15a is widened downward when viewed in the axial direction. Specifically, the to-be-joined pipe contact unit 15 has a pair of linear portions 15a having upper end sides connected to each other and lower end sides separated from each other in the width direction. The upper end sides of the pair of linear portions 15a are fixed to the lower end portion of the connection support portion 16b of the support portion 16. Since the to-be-joined pipe contact unit 15 has such a configuration, even in a case where an outer diameter of the to-be-joined pipe W2 on the receiving port W2a side is different, the linear portion 15a of the to-be-joined pipe contact unit 15 is able to come into contact with an outer peripheral surface of the to-be-joined pipe W2 on the receiving port W2a side.

The pair of linear portions 15a of the to-be-joined pipe contact unit 15 comes into contact with portions of the outer peripheral surface of the to-be-joined pipe W2 on the receiving port W2a side, which are located in an inclined direction with respect to the width direction (for example, a direction of 45 degrees with respect to the width direction), when the receiving port W2a of the to-be-joined pipe W2 is viewed in the axial direction. Accordingly, the pipe-joining attachment 1 is positioned in the width direction and a direction orthogonal to the width direction (up-down direction) with respect to the receiving port W2a of the to-be-joined pipe W2.

The pair of linear portions 15a of the to-be-joined pipe contact unit 15 may come into contact with portions of the outer peripheral surface of the to-be-joined pipe W2 on the receiving port W2a side, which are located on one side or the other side in the width direction, or may come into contact with portions of the outer peripheral surface of the to-be-joined pipe W2 on the receiving port W2a side, which are located in one side (up in the example illustrated in FIGS. 4 and 5) in the direction orthogonal to the width direction. That is, the to-be-joined pipe contact unit 15 may come into contact with portions of the outer peripheral surface of the to-be-joined pipe W2 on the receiving port W2a side, which are located in at least one of one side in the width direction, the other side in the width direction, and the upper side when the receiving port W2a is viewed in the axial direction of the to-be-joined pipe W2. One of the pair of linear portions 15a of the to-be-joined pipe contact unit 15 may come into contact with the outer peripheral surface of the to-be-joined pipe W2 on the receiving port W2a side.

As described above, the pipe-joining attachment 1 is positioned with respect to the to-be-joined pipe W2 in the width direction and the up-down direction, and thereby the insertion port W1a of the pipe W1 gripped by the grip unit 12 of the pipe-joining attachment 1 is able to be positioned with respect to the receiving port W2a of the to-be-joined pipe W2 in the width direction and the up-down direction.

When the receiving port W2a of the to-be-joined pipe W2 is viewed in the axial direction, the width direction with respect to the to-be-joined pipe W2 corresponds to a first direction, and the up-down direction (direction orthogonal to the width direction) corresponds to a second direction. In a case where an axis M of the to-be-joined pipe W2 is parallel to the axis L of the pipe W1 and in a case where the axes L and M extend in the horizontal direction, the direction orthogonal to the width direction is the up-down direction.

As described above, the pipe-joining attachment 1 of the work machine according to the present embodiment has the arm connecting unit 11 connected to the arm 1003 of the work machine 1000, the grip unit 12 for gripping the pipe W1, and the to-be-joined pipe contact unit 15 that is located with respect to the grip unit 12 in the axial direction of the insertion port W1a of the pipe W1 which is gripped by the grip unit 12 and comes into contact with the outer peripheral surface of the to-be-joined pipe W2 to be joined to the pipe W1 on the receiving port W2a side.

The to-be-joined pipe contact unit 15 of the pipe-joining attachment 1 that grips the pipe W1 with the grip unit 12 comes into contact with the outer peripheral surface of the to-be-joined pipe W2 on the receiving port W2a side, and thereby the insertion port W1a of the pipe W1 is able to be positioned with respect to the receiving port W2a of the to-be-joined pipe W2. Moreover, as described above, even when joining the pipe W1 to the to-be-joined pipe W2 by bending the pipe W1 at a predetermined angle with respect to the to-be-joined pipe W2 by positioning the insertion port W1a of the pipe W1 with respect to the receiving port W2a of the to-be-joined pipe W2, the insertion port W1a of the pipe W1 is able to be easily positioned with respect to the receiving port W2a of the to-be-joined pipe W2.

Therefore, with the above-described configuration, even when joining the pipe W1 to the to-be-joined pipe W2 by bending the pipe W1 at a predetermined angle with respect to the to-be-joined pipe W2 in the groove in the ground, it is possible to realize the pipe-joining attachment 1 in which the insertion port W1a of the pipe W1 is able to be easily positioned with respect to the receiving port W2a of the to-be-joined pipe W2.

In the present embodiment, the to-be-joined pipe contact unit 15 comes into contact with portions of the outer peripheral surface of the to-be-joined pipe W2 on the receiving port W2a side, which are located in at least one of the width direction and the up-down direction when the receiving port W2a is viewed in the axial direction of the to-be-joined pipe W2.

As described above, the to-be-joined pipe contact unit 15 of the pipe-joining attachment 1 comes into contact with the receiving port W2a of the to-be-joined pipe W2, and thereby the insertion port W1a of the pipe W1 gripped by the grip unit 12 is able to be positioned with respect to the receiving port W2a of the to-be-joined pipe W2 in the width direction and the up-down direction when the receiving port W2a is viewed in the axial direction of the to-be-joined pipe W2. Accordingly, even when joining the pipe W1 to the to-be-joined pipe W2 by bending the pipe W1 at a predetermined angle with respect to the to-be-joined pipe W2, the pipe-joining attachment 1 is obtained in which the insertion port W1a of the pipe W1 is able to be more accurately positioned with respect to the receiving port W2a of the to-be-joined pipe W2.

In the present embodiment, the pipe-joining attachment 1 further includes the horizontal-direction rotation mechanism 14 that is able to rotate the grip unit 12 in the horizontal direction around the rotation axis Q extending in the up-down direction.

Accordingly, the pipe W1 gripped by the grip unit 12 is able to be rotated in the horizontal direction around the rotation axis Q extending in the up-down direction. Therefore, according to the pipe-joining attachment 1 having the configuration of the present embodiment, the insertion port W1a of the pipe W1 is able to be easily positioned with respect to the receiving port W2a of the to-be-joined pipe W2 disposed in the groove in the ground without moving or turning the work machine 1000.

In the present embodiment, the pipe-joining attachment 1 further includes the axial-direction movement mechanism 13 that is able to move the grip unit 12 toward the to-be-joined pipe contact unit 15 in the axial direction.

Accordingly, the pipe W1 gripped by the grip unit 12 is able to be moved toward the receiving port W2a of the to-be-joined pipe W2 with which the to-be-joined pipe contact unit 15 comes into contact. Therefore, the insertion port W1a of the pipe W1 gripped by the grip unit 12 is able to be inserted into the receiving port W2a in a state of being positioned with respect to the receiving port W2a of the to-be-joined pipe W2. Accordingly, even when joining the pipe W1 to the to-be-joined pipe W2 by bending the pipe W1 at a predetermined angle with respect to the to-be-joined pipe W2, the joining work between the pipe W1 and the to-be-joined pipe W2 is able to be easily performed.

The work machine 1000 according to the present embodiment has the pipe-joining attachment 1 having the configuration of the present embodiment and the arm 1003 where the pipe-joining attachment 1 is attached to the tip portion.

Accordingly, it is possible to realize the work machine 1000 including the pipe-joining attachment 1 having the configuration of the present embodiment. Therefore, the insertion port W1a of the pipe W1 is able to be easily positioned with respect to the receiving port W2a of the to-be-joined pipe W2 by using the work machine 1000.

(Pipe-Joining Method)

Figure 6:
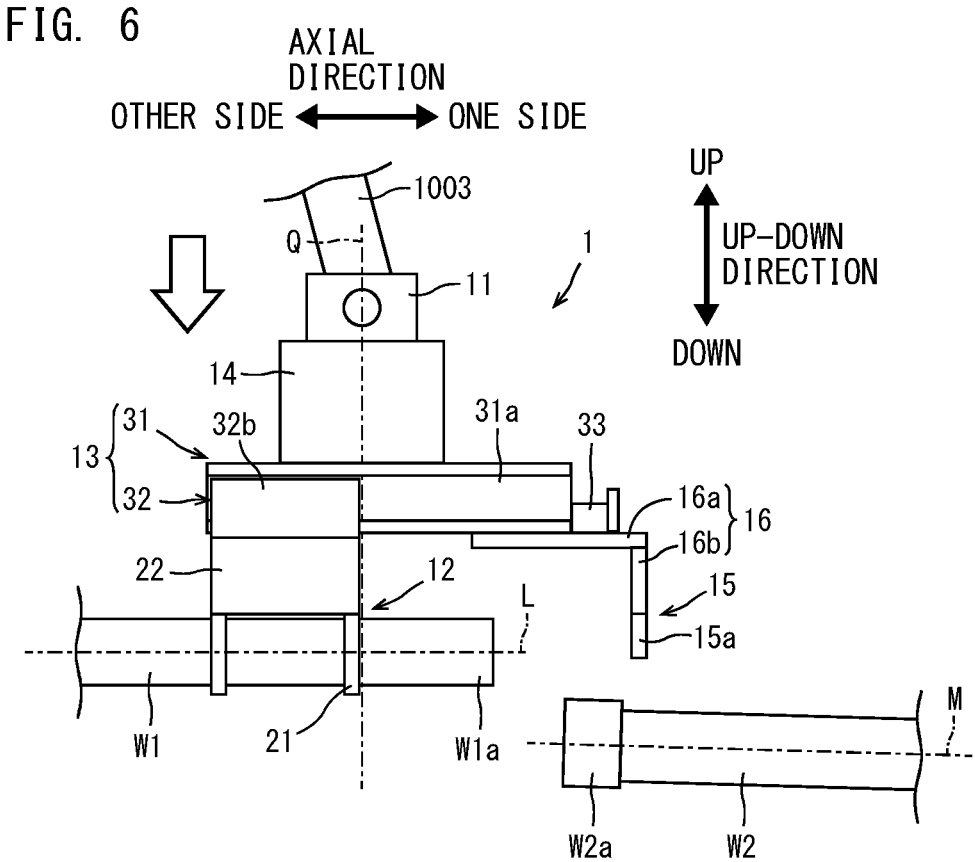
FIG. 6 is a view schematically illustrating an appearance in which a pipe and a to-be-joined pipe are joined together by using the pipe-joining attachment.
Figures 7, 8:
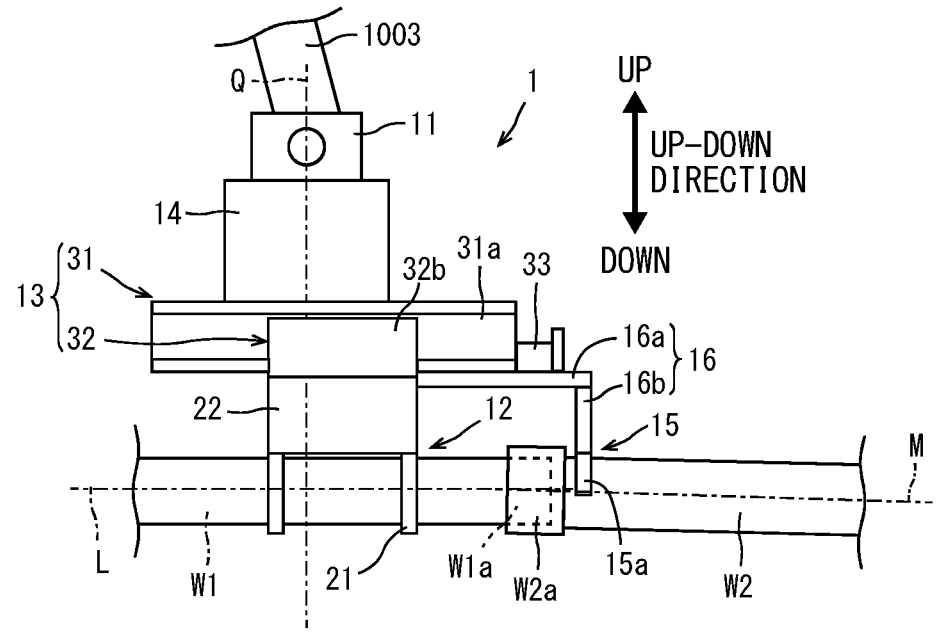
FIG. 7 is a view schematically illustrating an appearance in which the pipe and the to-be-joined pipe are joined together by using the pipe-joining attachment.
FIG. 8 is a view schematically illustrating an appearance in which the pipe and the to-be-joined pipe are joined together by using the pipe-joining attachment.

Next, a method of joining the pipe W1 and the to-be-joined pipe W2 using the pipe-joining attachment 1 having the above-described configuration will be described with reference to FIGS. 6 to 8. FIGS. 6 to 8 are views schematically illustrating an appearance in which the pipe W1 and the to-be-joined pipe W2 are joined together by using the pipe-joining attachment 1. FIGS. 6 to 8 illustrate an example of a pipe-joining method in a case where the axis L of the pipe W1 and the axis M of the to-be-joined pipe W2 are not parallel to each other and intersect with each other.

As illustrated in FIG. 6, in the pipe-joining attachment 1 connected to the tip portion of the arm 1003 of the work machine 1000, the pair of grip claws 21 of the grip unit 12 is moved in a closing direction to grip the pipe W1. As described above, the step of gripping the pipe W1 by the grip unit 12 is a gripping step.

The operator operates the arm 1003 or the like of the work machine 1000, thereby moving the pipe-joining attachment 1 in a state of gripping the pipe W1 into the groove (not illustrated) in the ground where the to-be-joined pipe W2 is disposed. At this time, the operator operates the arm 1003 or the like of the work machine 1000, thereby moving the pipe-joining attachment 1 such that the to-be-joined pipe contact unit 15 of the pipe-joining attachment 1 is positioned above the to-be-joined pipe W2 on the receiving port W2a side.

Next, the operator operates the arm 1003 or the like of the work machine 1000, thereby lowering the pipe-joining attachment 1 (white arrow in FIG. 6 is a moving direction of the pipe-joining attachment 1) such that the to-be-joined pipe contact unit 15 of the pipe-joining attachment 1 comes into contact with the outer peripheral surface of the to-be-joined pipe W2 on the receiving port W2a side. At least one of the pair of linear portions 15a of the to-be-joined pipe contact unit 15 of the pipe-joining attachment 1 comes into contact with the outer peripheral surface of the to-be-joined pipe W2 on the receiving port W2a side. Accordingly, even in a case where the axis L of the pipe W1 intersects the axis M of the to-be-joined pipe W2, the insertion port W1a of the pipe W1 gripped by the pair of grip claws 21 of the pipe-joining attachment 1 is able to be positioned with respect to the receiving port W2a of the to-be-joined pipe W2 in the width direction and the up-down direction.

In this manner, in a state where the pipe W1 is gripped by the grip unit 12, the step of positioning the insertion port W1a of the pipe W1 with respect to the receiving port W2a of the to-be-joined pipe W2 by bringing the to-be-joined pipe contact unit 15 into contact with the receiving port W2a of the to-be-joined pipe W2 is a positioning step.

Then, as illustrated in FIG. 7, the grip unit 12 is moved in the axial direction along the guide portion 31 (white arrow in FIG. 7 is a moving direction of the pipe-joining attachment 1). Accordingly, as illustrated in FIG. 8, the insertion port W1a of the pipe W1 gripped by the grip unit 12 is inserted into the receiving port W2a of the to-be-joined pipe W2 to be joined. Therefore, the pipe W1 is able to be joined to the to-be-joined pipe W2 by bending the pipe W1 at a predetermined angle with respect to the to-be-joined pipe W2.

The pipe-joining method using the pipe-joining attachment 1 according to the present embodiment is a pipe-joining method of joining the insertion port W1a of the pipe W1 to the receiving port W2a of the to-be-joined pipe W2 by using the pipe-joining attachment 1 having the configuration of the present embodiment. This pipe-joining method includes the gripping step of gripping the pipe W1 by the grip unit 12, and the positioning step of positioning the insertion port W1a of the pipe W1 with respect to the receiving port W2a of the to-be-joined pipe W2 by bringing the to-be-joined pipe contact unit 15 into contact with the receiving port W2a of the to-be-joined pipe W2 in a state of gripping the pipe W1 by the grip unit 12.

Accordingly, even when joining the pipe W1 to the to-be-joined pipe W2 by bending the pipe W1 at a predetermined angle with respect to the to-be-joined pipe W2, the insertion port W1a of the pipe W1 is able to be easily positioned with respect to the receiving port W2a of the to-be-joined pipe W2 by using the pipe-joining attachment 1 having the configuration of the present embodiment.

Embodiment 2

Figure 9:
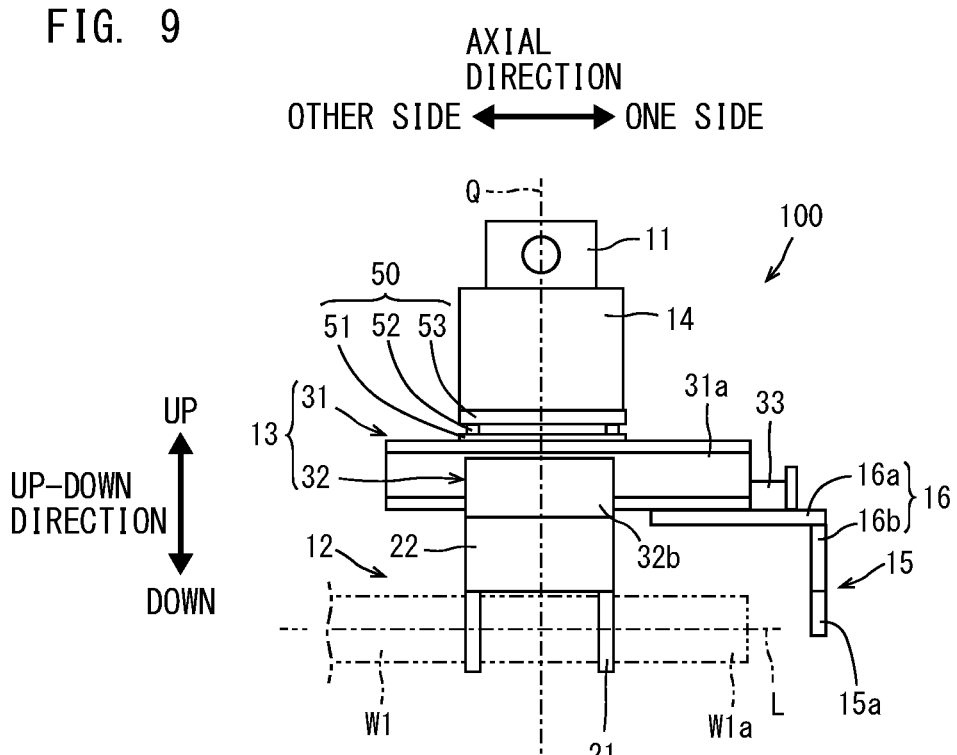
FIG. 9 is a view of a pipe-joining attachment according to Embodiment 2 as viewed from one side in the width direction.
Figure 10:
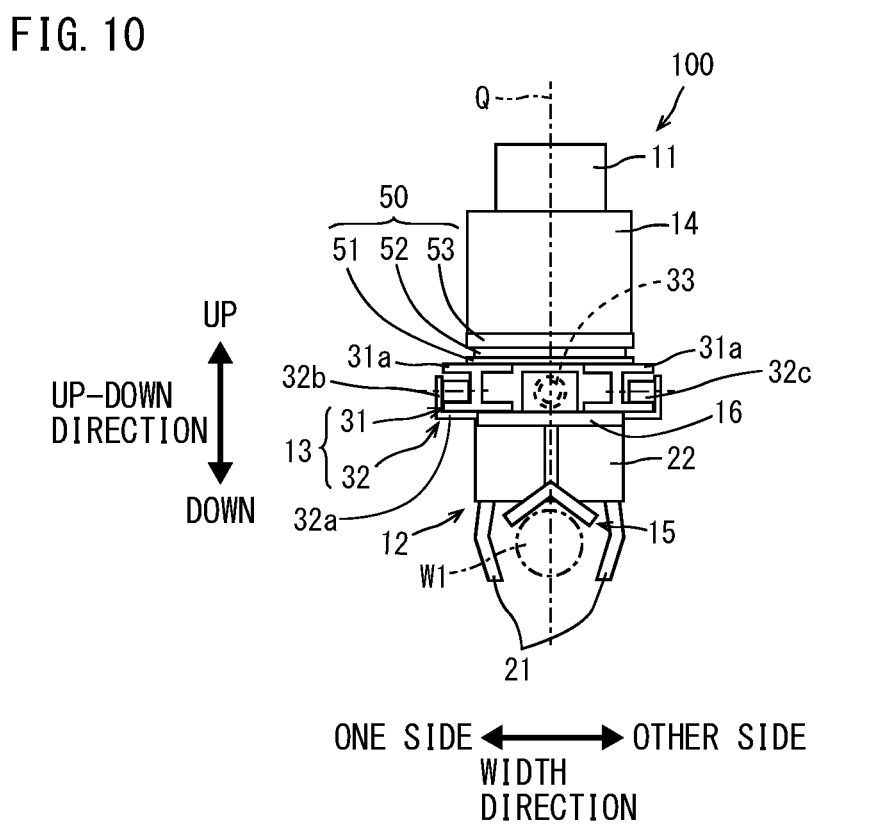
FIG. 10 is a view of the pipe-joining attachment according to Embodiment 2 as viewed from one side in the axial direction.

FIGS. 9 and 10 illustrate a schematic configuration of a pipe-joining attachment 100 according to Embodiment 2. FIG. 9 is a view of the pipe-joining attachment 100 as viewed from one side in the width direction. FIG. 10 is a view of the pipe-joining attachment 100 as viewed from one side in the axial direction.

The pipe-joining attachment 100 is configured to be movable in a direction that is orthogonal to the axial direction and is the horizontal direction (width direction). Specifically, as illustrated in FIGS. 9 and 10, in addition to the configuration of Embodiment 1, the pipe-joining attachment 100 has a horizontal-direction movement mechanism 50.

The horizontal-direction movement mechanism 50 is located between the horizontal-direction rotation mechanism 14 and the axial-direction movement mechanism 13.

The horizontal-direction movement mechanism 50 has a base 51, a pair of guide rails 52, and a slider 53.

The base 51 is a plate-shaped member and is fixed to an upper portion of the guide portion 31 of the axial-direction movement mechanism 13. Each of the pair of guide rails 52 extends in the width direction and is fixed to an upper surface of the base 51. The slider 53 is a plate-shaped member and is movable with respect to the pair of guide rails 52 in the width direction. The horizontal-direction rotation mechanism 14 is connected to the upper surface of the slider 53 to be rotatable in the horizontal direction.

As described above, the pipe-joining attachment 100 according to the present embodiment has the horizontal-direction movement mechanism 50 that is able to move the grip unit 12 in a direction that is orthogonal to the axis L of the pipe W1 gripped by the grip unit 12 and is the horizontal direction.

The horizontal-direction movement mechanism 50 having such a configuration allows the grip unit 12 of the pipe-joining attachment 100 to be moved in a direction that is orthogonal to the axial direction and is the horizontal direction (width direction). Therefore, the horizontal-direction movement mechanism 50 makes it possible to finely adjust the position of the pipe W1 gripped by the grip unit 12 in the width direction. Accordingly, the insertion port W1a of the pipe W1 gripped by the grip unit 12 is able to be easily and accurately positioned with respect to the receiving port W2a of the to-be-joined pipe W2 without moving the work machine 1000.

Other Embodiments

Although the embodiments of the present invention are described above, the above-described embodiments are merely examples for implementing the present invention. Therefore, the present invention is not limited to the above-described embodiments, and the above-described embodiments are able to be appropriately modified and implemented within a range not deviating from the gist thereof.

In each of the above-described embodiments, the pipe-joining attachments 1 and 100 include the axial-direction movement mechanism 13. However, the pipe-joining attachment may not have the axial-direction movement mechanism.

In each of the above-described embodiments, the pipe-joining attachments 1 and 100 include the horizontal-direction rotation mechanism 14. However, the pipe-joining attachment may not have the horizontal-direction rotation mechanism.

In each of the above-described embodiments, the arm connecting unit 11 is located at the upper end portion of the pipe-joining attachment 1. However, the arm connecting unit may be located at a position other than the upper end portion of the pipe-joining attachment.

In each of the above-described embodiments, the grip unit 12 has the pair of grip claws 21. However, the grip unit may have other configurations such as a suction mechanism, for example, as long as the grip unit has a configuration in which the pipe is able to be gripped.

In each of the above-described embodiments, the pair of grip claws 21 of the pipe-joining attachment 1 are located side by side in the width direction orthogonal to the axial direction. However, the pair of grip claws may be located at positions shifted in the up-down direction or may be located at positions shifted in the axial direction.

In each of the above-described embodiments, the grip unit 12 has two sets of the pair of grip claws 21. However, the grip unit may have three or more sets of the pair of grip claws.

In each of the above-described embodiments, the guide portion 31 of the pipe-joining attachment 1 has, for example, the pair of guide rails 31a extending along the axis L of the pipe W1. However, the guide portion may have one, or three or more guide rails. The guide portion may have a configuration other than the guide rail as long as the slider is movable in the axial direction.

In each of the above-described embodiments, the slider 32 of the pipe-joining attachment 1 is a member having a substantially U-shaped cross section having the bottom surface 32a and the pair of side surfaces 32b extending upward from the bottom surface 32a. However, the slider may have any shape such as a flat plate shape or a block shape as long as the grip unit 12 is movable in the axial direction with respect to the guide portion.

In each of the above-described embodiments, the axial-direction driving portion 33 is the hydraulic cylinder. However, the axial-direction driving portion may be a driving device other than the hydraulic cylinder, such as an electric actuator, as long as the slider is movable in the axial direction with respect to the guide portion.

In each of the above-described embodiments, the to-be-joined pipe contact unit 15 is formed in the inverted V shape. However, the to-be-joined pipe contact unit may be formed in an inverted U shape that opens downward. In this case, a distance between the pair of linear portions constituting the inverted U-shaped to-be-joined pipe contact unit has a dimension in which the pipe main body on the receiving port side in the to-be-joined pipe is able to be inserted. The to-be-joined pipe contact unit may have a shape other than the V shape such as an L shape, an inverted L shape, or a T shape as long as the to-be-joined pipe contact unit has any shape that is able to come into contact with the to-be-joined pipe on the receiving port side to position the pipe-joining attachment with respect to the receiving port of the to-be-joined pipe in the width direction and the direction orthogonal to the width direction when the receiving port of the to-be-joined pipe is viewed in the axial direction. The to-be-joined pipe contact unit may have a shape (linear shape, flat plate shape, curved shape, or the like) that is able to come into contact with the to-be-joined pipe on the receiving port side to position the pipe-joining attachment with respect to the receiving port of the to-be-joined pipe in the width direction and the direction orthogonal to the width direction when the receiving port of the to-be-joined pipe is viewed in the axial direction.

In each of the above-described embodiments, the work machine may have an image acquisition portion, for example, in the arm 1003, which acquires an image on which the position of the to-be-joined pipe contact unit 15 of the pipe-joining attachments 1 and 100 with respect to the receiving port W2a of the to-be-joined pipe W2 is able to be grasped.

Figure 11:
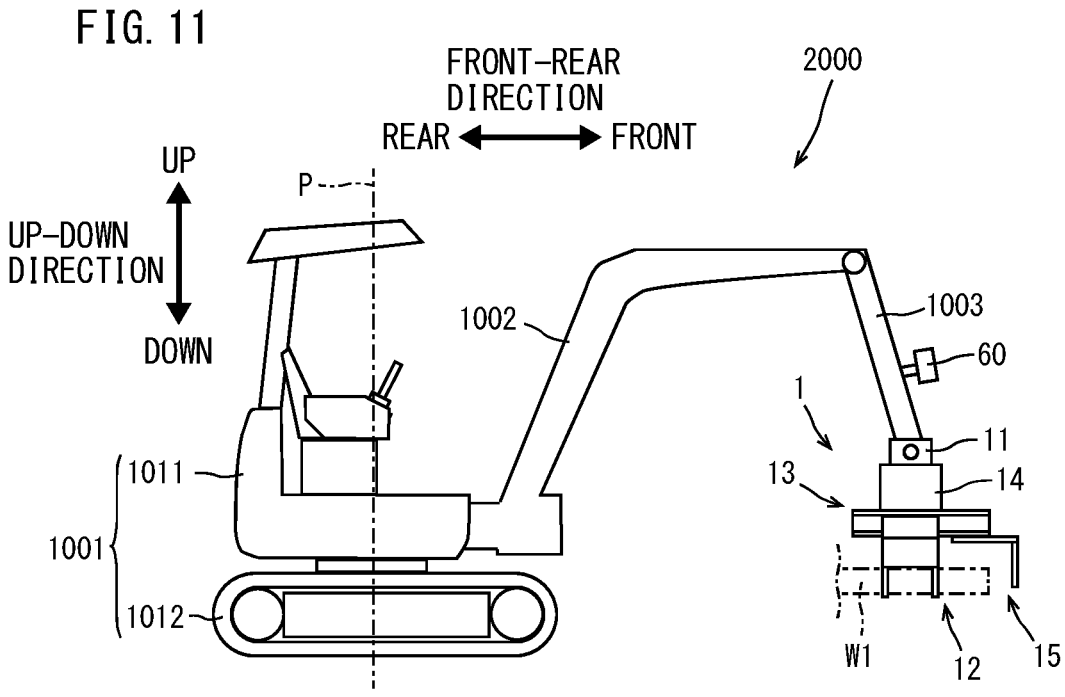
FIG. 11 is a view illustrating a schematic configuration of a work machine in which a camera, which is an image acquisition portion, is attached to an arm.

FIG. 11 is a view illustrating a schematic configuration of a work machine 2000 in which a camera 60, which is an image acquisition portion, is attached to the arm 1003. The camera 60 is attached to the arm 1003 of the work machine 2000 such that the to-be-joined pipe contact unit 15 located below the arm 1003 is located within an imaging range. That is, the work machine 2000 further includes the camera 60 that acquires an image capable of grasping the position of the to-be-joined pipe contact unit 15 of the pipe-joining attachments 1 and 100 with respect to the receiving port W2*a* of the to-be-joined pipe W2.

The image acquired by the camera 60 may be displayed on a display (not illustrated) that presents information to the operator, or may be transmitted to a control device (not illustrated), and then be used for the control of the work machine 2000 or the like in the control device.

Accordingly, the operator or the control device is able to easily grasp the position of the to-be-joined pipe contact unit 15 of the pipe-joining attachments 1 and 100 with respect to the receiving port W2*a* of the to-be-joined pipe W2 with the image acquired by the camera 60. Therefore, the to-be-joined pipe contact unit 15 of the pipe-joining attachments 1 and 100 is able to easily come into contact with the receiving port W2*a* of the to-be-joined pipe W2. Therefore, the insertion port W1*a* of the pipe W1 is able to be easily positioned with respect to the receiving port W2*a* of the to-be-joined pipe W2 by using the work machine 2000.

The camera 60 may be attached to the boom of the work machine, or may be attached to the upper turning body. Further, the camera 60 may be attached to the pipe-joining attachments 1 and 100.

Figure 12:
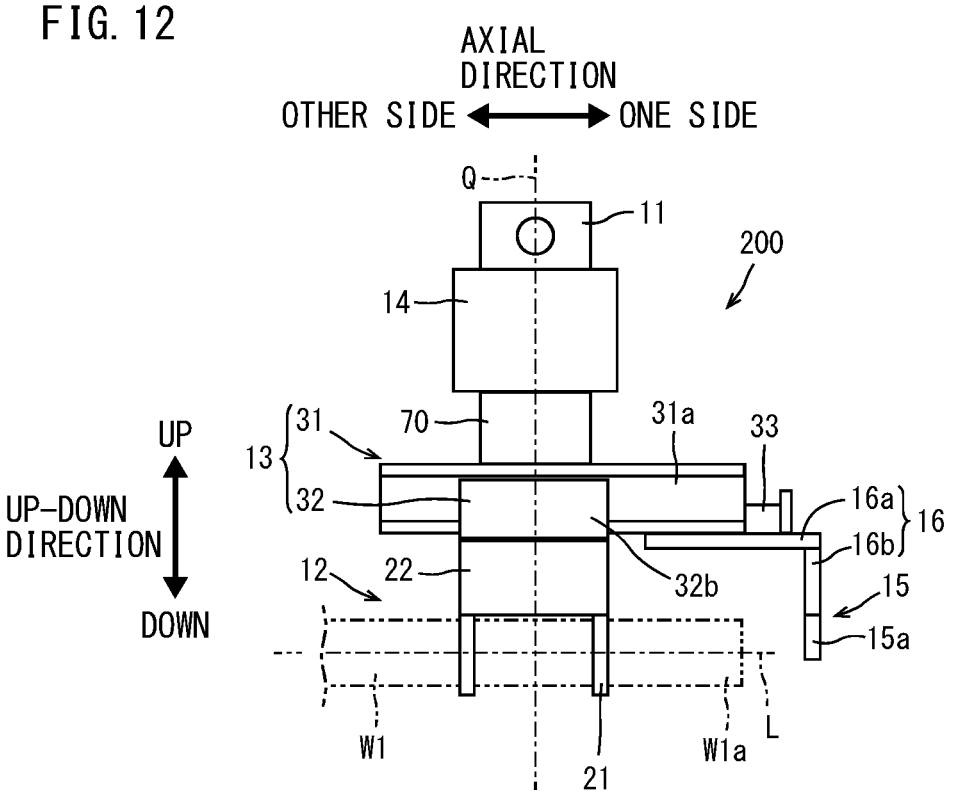
FIG. 12 is a view of a pipe-joining attachment according to another embodiment as viewed from one side in the width direction.

In each of the above-described embodiments, the pipe-joining attachments 1 and 100 may have an elastic support portion that elastically supports the grip unit 12 and the to-be-joined pipe contact unit 15 in the up-down direction. For example, as illustrated in FIG. 12, a pipe-joining attachment 200 may have an elastic support portion 70, which elastically supports the axial-direction movement mechanism 13 with respect to the horizontal-direction rotation mechanism 14 in the up-down direction, between the horizontal-direction rotation mechanism 14 and the axial-direction movement mechanism 13. The elastic support portion 70 includes, for example, a member such as a spring or rubber that connects the horizontal-direction rotation mechanism 14 and the axial-direction movement mechanism 13. Accordingly, the grip unit 12 that is supported so as to be movable in the axial direction by the axial-direction movement mechanism 13 and the to-be-joined pipe contact unit 15 that is supported by the guide portion 31 of the axial-direction movement mechanism 13 are able to be elastically supported by the elastic support portion 70 with respect to the horizontal-direction rotation mechanism 14 in the up-down direction. Therefore, it is possible to reduce an impact applied to the to-be-joined pipe W2 when the to-be-joined pipe contact unit 15 comes into contact with the outer peripheral surface of the to-be-joined pipe W2 on the receiving port W2*a* side in a state where the pipe W1 is gripped by the grip unit 12. The elastic support portion as described above may be provided in the pipe-joining attachment 100 illustrated in FIGS. 9 and 10.

FIGS. 6 to 8 that describe the pipe-joining method of Embodiment 1 illustrate an example of the pipe-joining method in a case where the axis L of the pipe W1 and the axis M of the to-be-joined pipe W2 are not parallel to each other and intersect with each other. However, even in a case where the axis L of the pipe W1 is parallel to the axis M of the to-be-joined pipe W2, the pipe-joining attachments 1, 100, and 200 having the configurations of the respective embodiments described above are able to use to position the insertion port W1*a* of the pipe W1 with respect to the receiving port W2*a* of the to-be-joined pipe W2.

Industrial Applicability

The present invention is able to be used for a pipe-joining attachment that is connected to an arm of a work machine and is used for joining a pipe to a to-be-joined pipe.

DESCRIPTION OF REFERENCE NUMERALS

1, 100, 200 pipe-joining attachment
11 arm connecting unit
12 grip unit
13 axial-direction movement mechanism
14 horizontal-direction rotation mechanism
15 to-be-joined pipe contact unit
15*a* linear portion
16 supporting portion
16*a* support main body
16*b* connection support portion
21 grip claw
22 grip driving portion
31 guide portion
31*a* guide rail
32 slider
32*a* bottom surface
32*b* side surface
32*c* roller
33 axial-direction driving portion
50 horizontal-direction movement mechanism
51 base
52 guide rail
53 slider
60 camera (image acquisition portion)
70 elastic support portion
1000, 2000 work machine
1001 work machine main body
1002 boom
1003 arm
1011 upper turning body
1012 lower traveling body
W1 pipe
W1*a* insertion port
W2 to-be-joined pipe
W2*a* receiving port
P, Q rotation axis
L, M axis

The invention claimed is:

1. A pipe-joining attachment of a work machine, comprising:

an arm connecting unit connected to an arm of the work machine;

a grip unit configured to be supported by the arm connecting unit and to grip a pipe;

a support portion configured to be supported by the arm connecting unit, the support portion being extending to be located in an axial direction of an insertion port of the pipe a part of which is gripped by the grip unit and extending downward with respect to the grip unit at a position in the axial direction; and a to-be-joined pipe contact unit configured to be connected to a lower end of the support portion, to be located with respect to the grip unit in the axial direction, to come into contact with only a portion, that is located above an axis of a to-be-joined pipe, of an outer peripheral surface of the to-be-joined pipe to be joined to the pipe on a receiving port side.

2. The pipe-joining attachment of a work machine according to claim 1, wherein the to-be-joined pipe contact unit comes into contact with a portion of the outer peripheral surface of the to-be-joined pipe on the receiving port side, the portion being located in at least one of a first direction and a second direction orthogonal to the first direction when the receiving port is viewed in an axial direction of the to-be-joined pipe.

3. The pipe-joining attachment of the work machine according to claim 1, further comprising:

a horizontal-direction rotation mechanism configured to rotate the grip unit in a horizontal direction around a rotation axis extending in an up-down direction.

4. The pipe-joining attachment of the work machine according to claim 1, further comprising:

a horizontal-direction movement mechanism configured to move the grip unit in a direction that is orthogonal to an axis of the pipe gripped by the grip unit and is the horizontal direction.

5. The pipe-joining attachment of the work machine according to claim 1, further comprising:

an axial-direction movement mechanism configured to move the grip unit toward the to-be-joined pipe contact unit in the axial direction.

6. A work machine comprising:

the pipe-joining attachment of the work machine according to claim 1; and the arm where the pipe-joining attachment is attached to a tip portion.

7. The work machine according to claim 6, further comprising:

an image acquisition portion configured to acquire an image on which a position of the to-be-joined pipe contact unit of the pipe-joining attachment with respect to a receiving port of the to-be-joined pipe is able to be grasped.

8. A pipe-joining method of joining an insertion port of a pipe to a receiving port of a to-be-joined pipe by using the pipe-joining attachment of the work machine according to claim 1, the pipe-joining method comprising:

gripping the pipe by a grip unit; and positioning the insertion port of the pipe with respect to the receiving port of the to-be-joined pipe by bringing a to-be-joined pipe contact unit into contact with the receiving port of the to-be-joined pipe in a state of gripping the pipe by the grip unit.

\* \* \* \* \*